(12) United States Patent
Gardner et al.

(10) Patent No.: US 10,293,904 B2
(45) Date of Patent: May 21, 2019

(54) DEPLOYABLE WINGSAIL FOR CONTAINER SHIPS

(71) Applicant: Wind + Wing Technologies, Inc., Napa, CA (US)

(72) Inventors: Jay Michael Gardner, Napa, CA (US); George Reginald Seyfang, Preston (GB)

(73) Assignee: Wind + Wing Technologies, Inc., Napa, CA (US)

( * ) Notice: Subject to any disclaimer, the term of this patent is extended or adjusted under 35 U.S.C. 154(b) by 0 days.

(21) Appl. No.: 15/593,111

(22) Filed: May 11, 2017

(65) Prior Publication Data

US 2017/0327196 A1 Nov. 16, 2017

Related U.S. Application Data

(60) Provisional application No. 62/336,491, filed on May 13, 2016.

(51) Int. Cl.
| | |
|---|---|
| *B63H 9/04* | (2006.01) |
| *B63H 9/06* | (2006.01) |
| *B61D 3/16* | (2006.01) |
| *B61D 45/00* | (2006.01) |
| *B65D 88/12* | (2006.01) |
| *B65D 90/00* | (2006.01) |

(52) U.S. Cl.
CPC ............ *B63H 9/0607* (2013.01); *B61D 3/16* (2013.01); *B61D 45/00* (2013.01); *B61D 45/007* (2013.01); *B63H 9/04* (2013.01); *B65D 88/121* (2013.01); *B65D 90/00* (2013.01); *B63H 2009/0628* (2013.01); *B65D 2590/0083* (2013.01)

(58) Field of Classification Search
CPC ........ B63H 9/0607; B63H 9/04; B61D 45/00; B61D 45/007; B61D 3/16; B65D 88/121; B63B 25/28
See application file for complete search history.

(56) References Cited

U.S. PATENT DOCUMENTS

| | | | | |
|---|---|---|---|---|
| 3,776,169 | A | * 12/1973 | Strecker | .................. B63B 25/28 114/72 |
| 8,800,460 | B2 | 8/2014 | Kosugi et al. | |
| 2005/0252764 | A1 | 11/2005 | Meller | |
| 2012/0090520 | A1 | 4/2012 | Kosugi et al. | |

(Continued)

FOREIGN PATENT DOCUMENTS

| | | |
|---|---|---|
| CN | 104909074 A | 9/2015 |
| DE | 156356 | 8/1982 |

(Continued)

OTHER PUBLICATIONS

International Search Report and Written Opinion dated Jul. 24, 2017, from application No. PCT/US2017/032544.

(Continued)

*Primary Examiner* — Stephen P Avila

(74) *Attorney, Agent, or Firm* — Foley & Lardner LLP

(57) ABSTRACT

A shipping container includes a container configured to be secured onto a vessel or a vehicle. The shipping container further includes at least one wingsail stored in the container and configured to be unfolded to deploy from the container and folded to be stowed in the container.

26 Claims, 14 Drawing Sheets

(56) References Cited

U.S. PATENT DOCUMENTS

| | | | |
|---|---|---|---|
| 2012/0292945 A1* | 11/2012 | Nusbaum | B62D 35/001 |
| | | | 296/180.4 |
| 2014/0144362 A1 | 5/2014 | Atkinson | |
| 2014/0174283 A1 | 6/2014 | Kempas | |
| 2015/0266555 A1* | 9/2015 | Dane | B63H 9/0607 |
| | | | 114/102.16 |
| 2016/0036375 A1 | 2/2016 | Ansari | |

FOREIGN PATENT DOCUMENTS

| | | |
|---|---|---|
| DE | 31 07 096 | 9/1982 |
| GB | 2 098 950 A | 12/1982 |
| GB | 2 234 723 | 2/1991 |
| JP | 57-178994 | 11/1982 |
| JP | 584696 | 1/1983 |
| JP | 2009-214673 A | 9/2009 |
| NZ | 618484 | 2/2014 |

OTHER PUBLICATIONS

Written Opinion dated Apr. 18, 2018, from application No. PCT/US2017/032544.
International Preliminary Report on Patentability dated Jul. 6, 2018, from application No. PCT/US2017/032544.

* cited by examiner

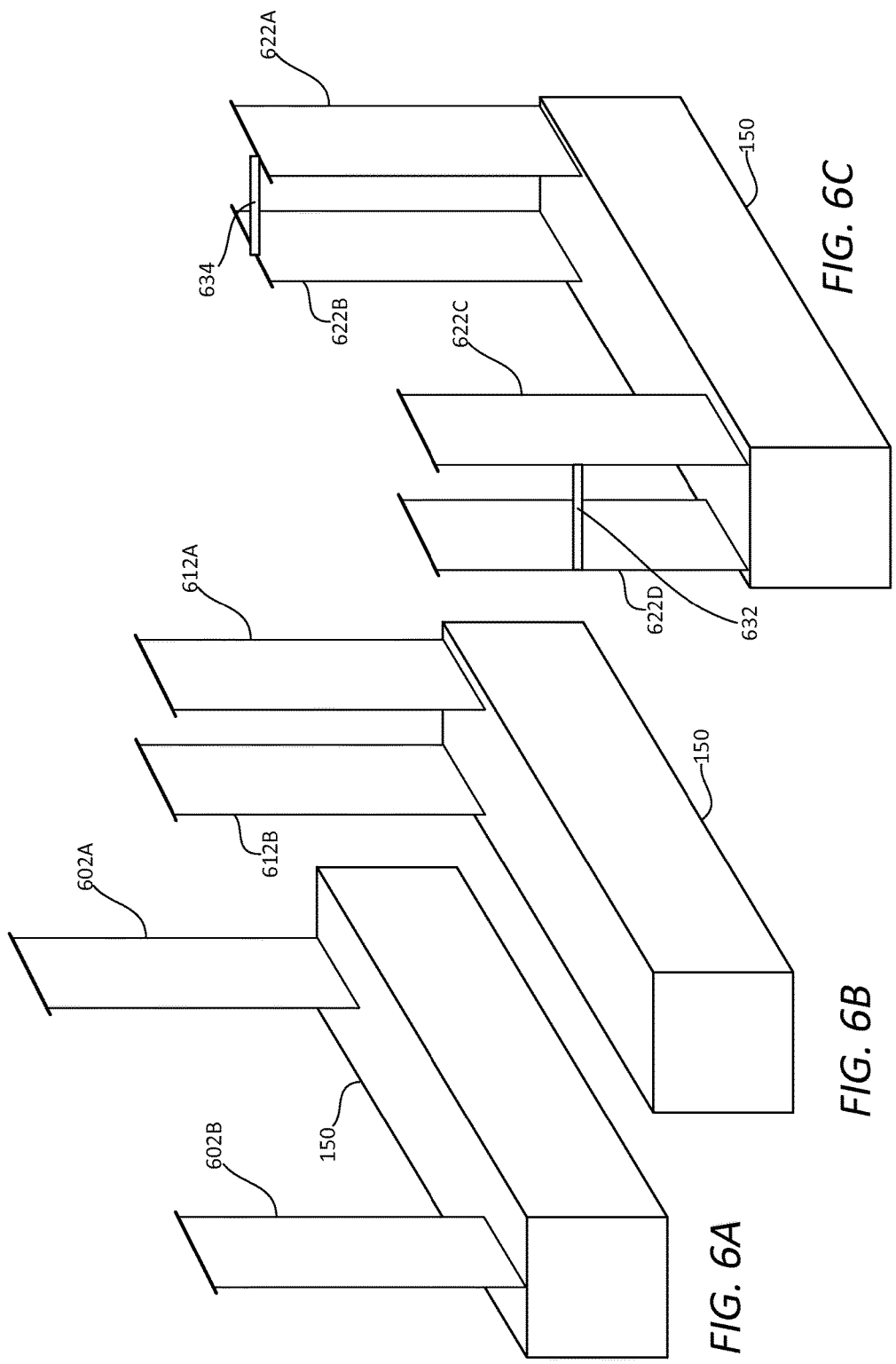

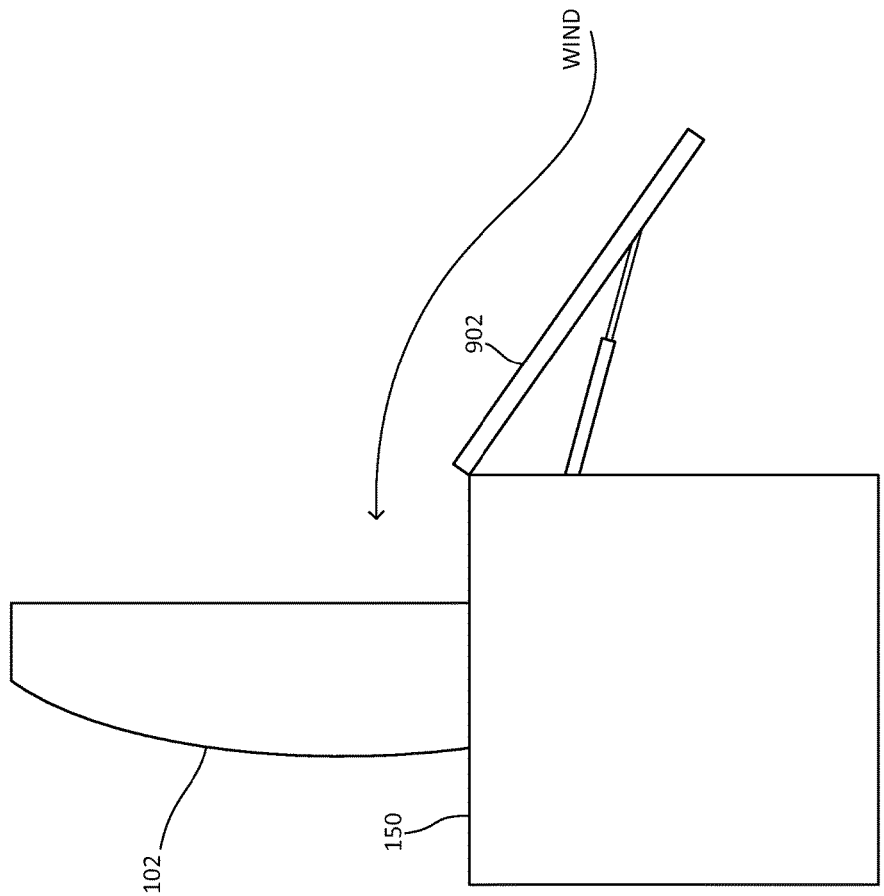
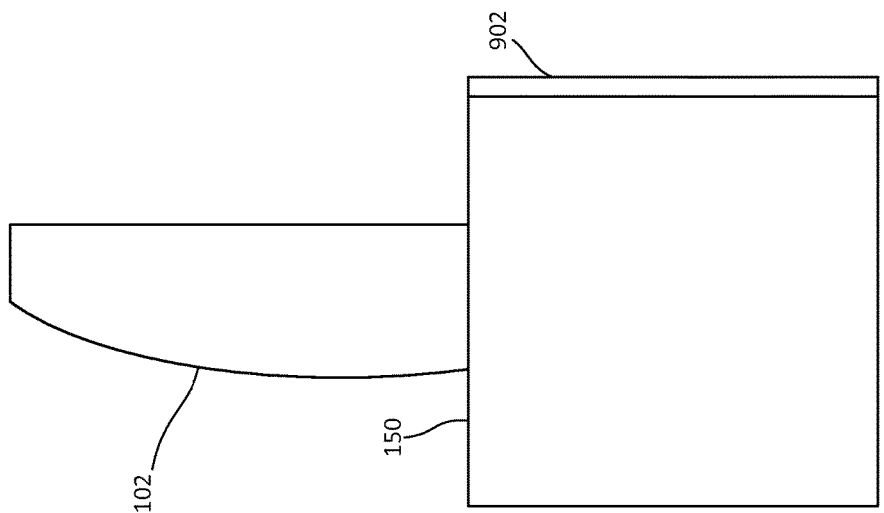
FIG. 9B
FIG. 9A

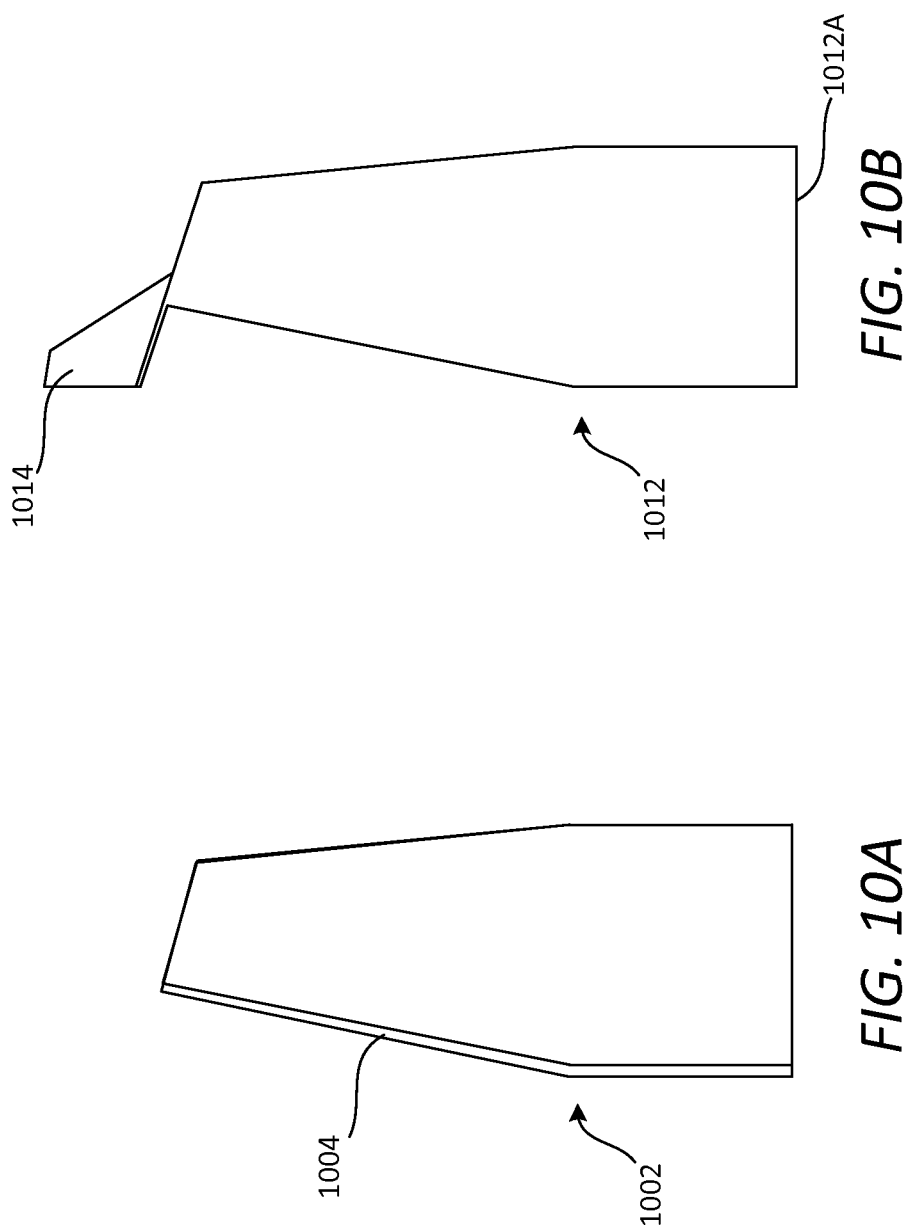

DEPLOYABLE WINGSAIL FOR CONTAINER SHIPS

CROSS-REFERENCE TO RELATED PATENT APPLICATIONS

This application claims priority from Provisional Application U.S. Application No. 62/336,491, filed May 13, 2016, incorporated herein by reference in its entirety.

BACKGROUND

1. Field

Subject matter described herein relates generally to wind propulsion of cargo ships, and, in particular, to containers housing deployable wingsails.

2. Background

Throughout the world, cargo is transported across oceans and other waterways via ships carrying standard-sized cargo containers. During travel, the cargo ships expend much fuel, resulting in high costs and harmful criteria pollutants and Green House Gas (GHG) emissions. As such, due to the prevalence of cargo shipping, there is a great need to abate fuel consumption for ships carrying cargo, which would result in cost savings and a mitigation of deleterious environmental effects.

In addition to ocean and other waterway transportation of cargo, railroads also move large volumes of cargo. Rail freight cargo provides major transporting means to the bulk commodities and construction sectors due to the significant economies of scale. For example, rail freight cargo account for substantial transportation of coal, raw ores, and grain. However, much like transportation via waterway, railway transportation via railway entails expending significant amounts of fuel, resulting in emissions of harmful criteria pollutants and GHG. Accordingly, a way to reduce these cargo transportation-based emissions in a cost effective manner is desirable.

SUMMARY

In general, various embodiments relate to a wingsail (e.g., a wingsail that is housed within a shipping container and is configured to be deployed during transportation of the container) on a vessel or on a vehicle. Accordingly, the wingsail can provide supplemental wind-based propulsion while the vessel is at sea or while the vehicle is on land, decreasing propulsion requirements from fossil fuel-based engines, and thus, resulting in a decrease in environmental emissions associated with transporting cargo. Further embodiments relate to systems employing a plurality of wingsail-containing shipping containers that are mounted on a container vessel or vehicle and controlled for selective deploying individually, or in one or more different combinations (or all together), depending upon the wind and other environmental conditions.

According to various embodiments, a shipping container includes a container configured to be secured onto a vessel or a vehicle. The shipping container further includes at least one wingsail stored in the container and configured to be unfolded to deploy from the container and folded to be stowed in the container.

In some embodiments, the at least one wingsail includes a plurality of wingsails.

In some embodiments, each of the plurality of wingsails is located at an opposite end of the container when unfolded.

In some embodiments, each of the plurality of wingsails is located at a same end of the container when unfolded.

In some embodiments, a width of the wingsail rests diagonally along one or both of a height or width dimension of the container when the wingsail is folded in the container.

In some embodiments, the vessel is one of a ship, a barge, a catamaran, or a yacht.

In some embodiments, the vehicle is a railcar.

In some embodiments, the shipping container further includes an air deflection panel affixed to a side surface of the container and configured to be selectively moved between an extended state and a folded state, wherein at least a portion of the air deflection panel is extended outwards at an angle from the side surface when in the extended state, and is folded towards the side surface when in the folded state.

In some embodiments, the container is removable from the vehicle or the vessel.

In some embodiments, the container has an interior volume that is configured to house the wingsail with the wingsail folded along its longitudinal axis and arranged along a length dimension of the container when the wingsail is folded and stowed in the container, and wherein the wingsail is configured to extend vertically along its longitudinal axis and be supported by the container when the wingsail is unfolded and deployed.

In some embodiments, the wingsail includes an extending portion and is configured to extend in height after deployment by the extending portion telescoping upwards or by the extending portion unfolding upwards.

According to various embodiments, a method of installing a shipping container includes providing a container configured to be secured onto a vessel or a vehicle. The method further includes storing at least one wingsail in the container, the wingsail configured to be unfolded to deploy from the container and folded to be stowed in the container.

In some embodiments, the method further includes securing the container to a vessel, wherein the vessel is one of a ship, a barge, a catamaran, or a yacht.

In some embodiments, the method further includes securing the container to a vehicle, wherein the vehicle is a railcar.

In some embodiments, the method further includes affixing an air deflection panel to a side surface of the container, the air deflection panel configured to extend outwards from and retract inwards into the container to change the aerodynamics of the container.

In some embodiments, the method further includes securing the container to a vehicle or a vessel with an anchoring mechanism that allows the container to be selectively removed from the vehicle or the vessel.

In some embodiments, the method further includes folding the wingsail along its longitudinal axis and arranging the folded wingsail along a length dimension of the container when the wingsail is stowed in the container, and extending the wingsail vertically along its longitudinal axis while being supported by the container when the wingsail is unfolded and deployed.

According to various embodiments, a ship includes a shipping container. The shipping container includes a container configured to be secured onto a vessel or a vehicle. The shipping container further includes at least one wingsail stored in the container and configured to be unfolded to deploy from the container and folded to be stowed in the container.

BRIEF DESCRIPTION OF THE DRAWINGS

FIG. 6A, FIG. 6B, and FIG. 6C illustrate perspective views of various wingsail configurations deployed from a container according to various embodiments.

FIG. 9A and FIG. 9B illustrate a side view of a container including a wingsail and an air deflection panel according to various embodiments.

FIG. 10A illustrates a side view of a wingsail according to various embodiments.

FIG. 10B illustrates a side view of a wingsail according to various embodiments.

DETAILED DESCRIPTION

Figure 1A:
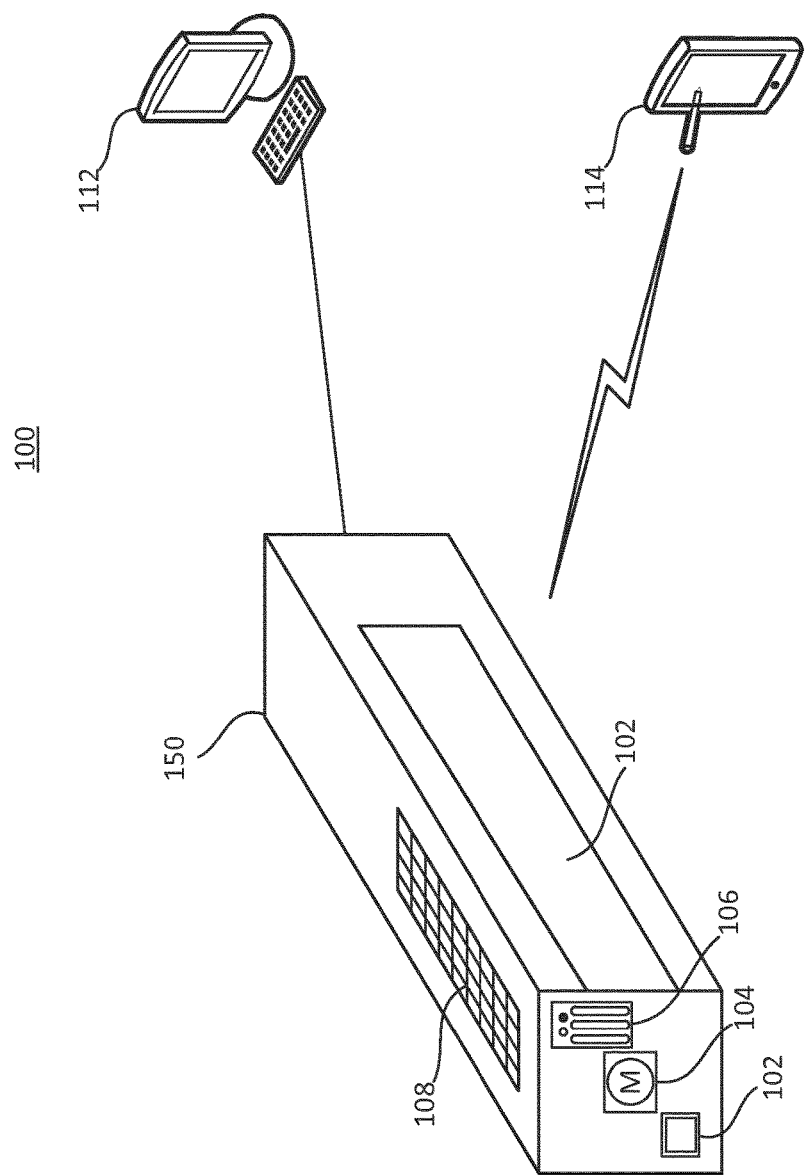
FIG. 1A illustrates a system including a wingsail housed in a container according to various embodiments.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Various embodiments relate to wingsails, which are aerodynamic structures that can be configured similar to an airplane wing, but are supported vertically to create "lift" directed to propel a vehicle forward (e.g., a water vessel, a ground vehicle, and the like). In some embodiments, a wingsail is housed within a shipping container and configured to be deployed during transportation of the container on a vehicle (e.g., while a ship is at sea or while a railcar is transporting the container on land). When deployed, the wingsail extends from the container and can utilize wind to help propel the vehicle forward.

According to various embodiments, one or more wingsails are stowed within a standard-sized shipping container, along with mechanisms for selectively deploying the wingsail from the container, and re-stowing the wingsail within the container after use. One or more of such containers may be anchored onto the top layer of containers of a vessel (e.g., a typical container ship and using container anchors typically used on such ships for anchoring containers during transportation), or on a railcar (e.g., using container anchors typically used on such railcars for anchoring containers during transportation).

In some embodiments, when the vessel is at sea, the wingsails may be deployed (e.g., extended upwards from the container, while still mounted to and supported by the anchored container). Before the vessel enters a port, or in conditions where wingsails may not be required, the wingsails may be retracted and re-stowed in the containers. By employing standard-sized containers, different types of vessels or railcars can be fitted with such containers, and such containers can be moved from vessel-to-vessel or railcar-to-railcar, as needed.

In some embodiments, different types of vessels that float on water can be fitted with wingsail containers described herein, such as, but not limited to, ordinary cargo ships, freight ships, ships including one or more hulls, barges, catamarans, yachts, and other suitable vessels. Although, the present disclosure describes the wingsail container with respect to a container ship, any other suitable vessel may be used.

In some embodiments, the wingsail is configured to deploy from a container by lifting (or tilting) upward from a generally horizontal state to a generally vertical state. Alternatively, the wingsail may be configured to deploy in a telescoping manner, or by unfolding or expanding (e.g., accordion-like or inflatable). More than one wingsail may be stowed and deployed from a given container. One or more wingsails may be stowed in a container with the width or length dimension of the wingsail arranged diagonally, to allow for maximizing the width or length of the wingsail stowed therein.

Figure 1B:
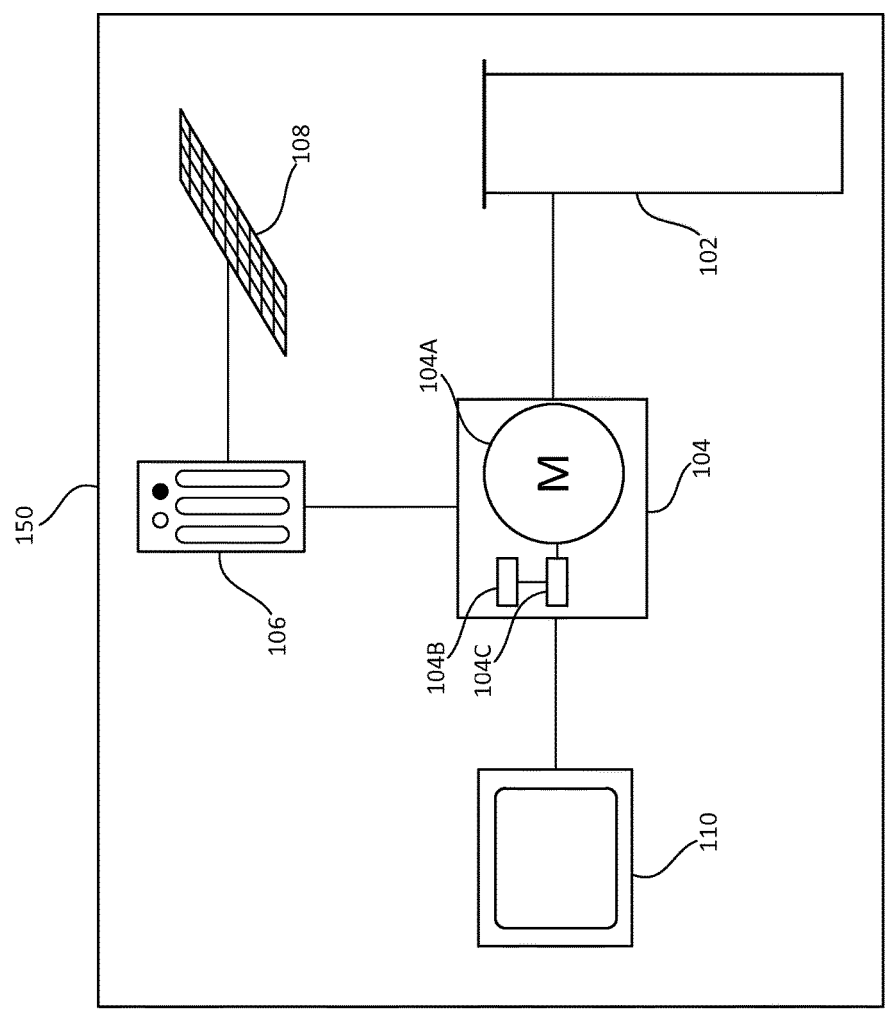
FIG. 1B illustrates a block diagram of a container housing a wingsail according to various embodiments.

FIG. 1A illustrates a system 100 including a wingsail 102 housed in a container 150 according to various embodiments. FIG. 1B illustrates a block diagram of the container 150 housing the wingsail 102 according to various embodiments.

Referring to FIGS. 1A-1B, in some embodiments, the container 150 is a standard-sized shipping container. As a non-limiting example, the container 150 is 2 twenty-foot equivalent units (TEUs). A TEU is a unit of container size that is equivalent to 20 feet (length) by 8 feet (width) by 8 feet (height). In some embodiments, the container 150 is a High Cube container that has a larger height than a 2 TEU container (e.g., having a height of about 9.5 feet). In some embodiments, the container 150 is an extended version of the standard 2 TEU container (e.g., having a length of about 45 feet, 48 feet, or 53 feet). The container 150 may be configured specifically for housing the wingsail or, alternatively, may include a conventional shipping container (configured for conventional shipping use) but modified to include the wingsail 102 and other features as described herein.

In some embodiments, the container 150 is configured to be anchored to a vessel (e.g., a deck of a ship). As such, the container 150 may include a plurality of anchor locations at a plurality of bottom corners of the container 150, or at other suitable locations on the container 150. Each of the anchor locations may be configured to engage with locking locations on the deck of the ship to secure the container 150 to the ship. In some embodiments, the container 150 may be stacked on top of one or more other containers. In such embodiments, the bottom-most container may be anchored to the ship and each subsequent container above the bottom-most container may be anchored to a container directly beneath the subsequent container. In particular embodiments, the container 150 is configured with anchor mechanisms or anchor hold structures that correspond to those used on conventional shipping containers, such that the container 150 may be secured to a container ship in a manner similar to the manner in which a conventional container is secured (without requiring the ship to have customized anchoring structure). In other embodiments, the container 150 may be configured with other suitable anchor mechanisms.

In some embodiments, the system 100 includes the container 150 housing the wingsail 102. The container 150 further includes one or more (or each) of a motor assembly 104, a battery 106, a solar panel 108, and a user interface (UI) 110. In addition, the system 100 includes a computer 112 connected to the container 150 and a tablet 114 wirelessly connected to the container 150.

In some embodiments, the motor assembly 104 includes a motor 104A, a memory 104B, and a processor 104C. The motor 104A is connected to the wingsail 102 and configured to power movement of the wingsail 102 between a deployed position and a housed or retracted position. The memory 104B and the processor 104C are configured to control the operation of the motor 104A.

In some embodiments, the UI 110 is configured to receive input from a user, such as commands to control the wingsail 102. In response to these received commands, the memory 104B and the processor 104C control the motor 104A in accordance with the commands. Furthermore, the wingsail 102 may be controlled via the motor assembly 104 by commands received from the computer 112 or the tablet 114. In some embodiments, the UI 102, the computer 112, and/or the tablet 114 are configured to display status information regarding the container 150 (e.g., the charge remaining in the battery 106).

In some embodiments, the battery 106 is coupled to the motor assembly 104. The battery 106 may provide power to the motor assembly 104. In addition, the battery 106 is coupled to the solar panel 108. The solar panel 108 may provide charge to the battery 106.

In some embodiments, the container 150 houses other types of propulsion aiding mechanisms in addition to, or instead of, the wingsail 102. For example, the container 150 may house a Flettner rotor that is configured to be housed within and deployed from the container 150. In some embodiments, the Flettner rotor may be deployed (e.g., by telescoping or by unfolding) when needed by the ship carrying the container 150, and stowed away (e.g., by retracting or folding) within the container 150 when not needed. In some embodiments, the container 150 houses yet other types of wind capturing devices that are configured to be stowed within and deployed from the container 150, such as, but not limited to, a kite sail.

Figure 2A:
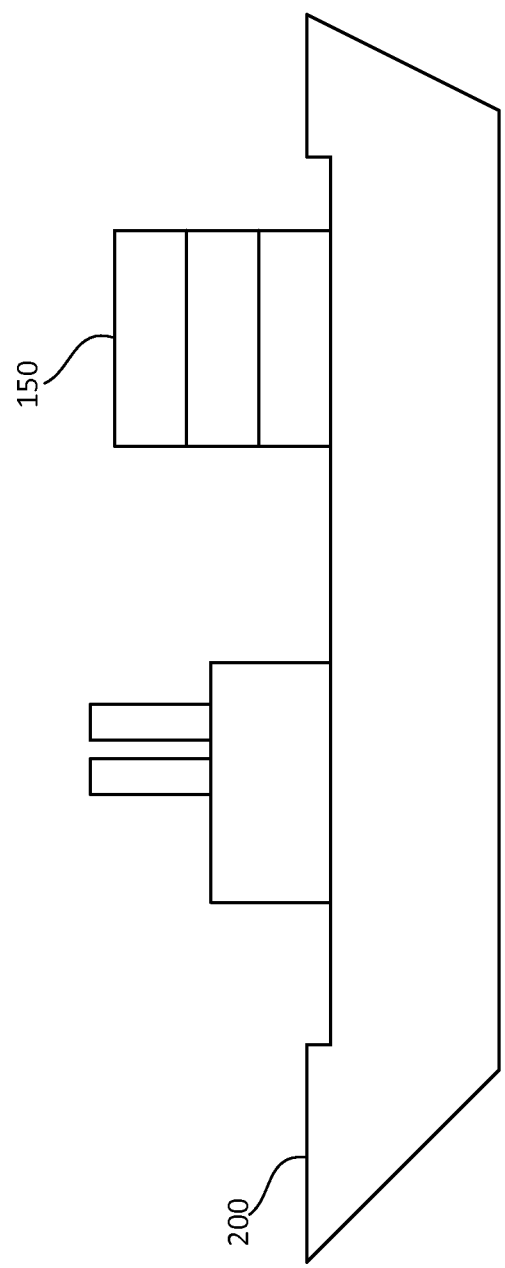
FIG. 2A illustrates a side view of a ship carrying a wingsail container according to various embodiments.

FIG. 2A illustrates a side view of a ship 200 carrying the wingsail container 150 according to various embodiments. Referring to FIGS. 1A-2A, in some embodiments, the wingsail container 150 is positioned at the top layer of containers. As such, the wingsail 102 can be deployed from the container 150 without being hindered by a container located on top of the container 150. Also, in some embodiments, the container 150 may be located at the highest level of containers so that the wingsail 150 is capable of receiving wind without surrounding containers blocking the wind path of the deployed wingsail 102.

Figure 2B:
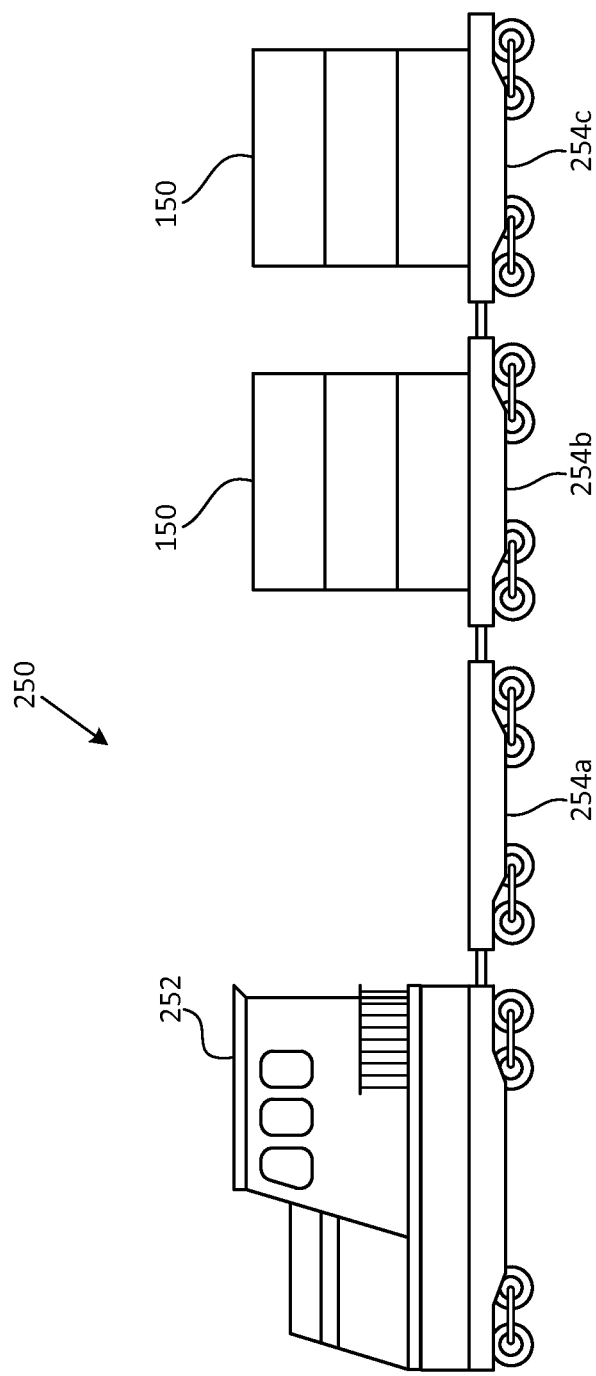
FIG. 2B illustrates a side view of a train carrying a wingsail container according to various embodiments.

FIG. 2B illustrates a side view of a train 250 carrying the wingsail container 150 according to various embodiments. Referring to FIGS. 1A-2B, in other embodiments, the wingsail container 150 may be carried by a train 250 including an engine 252 and a plurality of railcars 254a, 254b, and 254c. In some embodiments, the wingsail containers 150 that are carried by the railcars 254b and 254c are configured to operate (e.g., deploy) the wingsail 102 to provide supplemental thrust to the train 250 for propelling the train 250 forward along a railway, in the same manner that the wingsail 102 is operated (e.g., deployed) on a ship travelling on water, as described herein. In some embodiments, the train 250 has one railcar carrying the wingsail container 150. In other embodiments, the train 250 includes a plurality of railcars 254b and 254c that each carry one or more wingsail containers 150, while including one or more railcars 254a that do not carry a wingsail container 150. In some embodiments, the wingsail container 150 is located on top of the engine 252. Accordingly, the wingsail containers 150 may include anchor mechanisms or anchor hold structures that correspond to those used on conventional shipping containers that anchor to rail cars. In particular embodiments, the anchor mechanisms or anchor hold structures for anchoring to rail cars may be the same as those discussed above for anchoring to a ship deck or other container on a ship. In other embodiments, the wingsail container 150 may include multiple types of anchor mechanisms or anchor hold structures, for example, including one or more for anchoring to a ship deck or other container, and one or more for anchoring to a rail car.

Figure 3B:
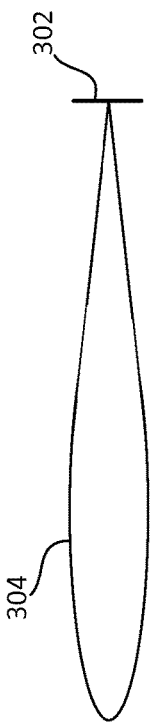
FIG. 3B illustrates a top view of a wingsail according to various embodiments.
Figure 3A:
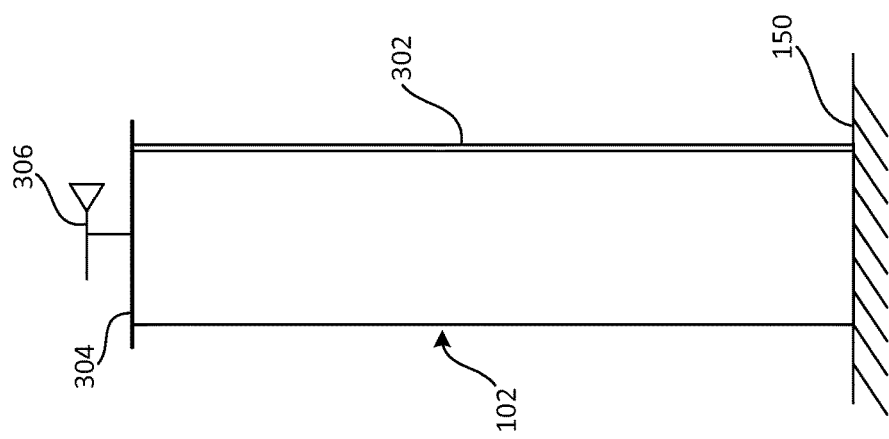
FIG. 3A illustrates a side view of a wingsail according to various embodiments.
Figure 3C:
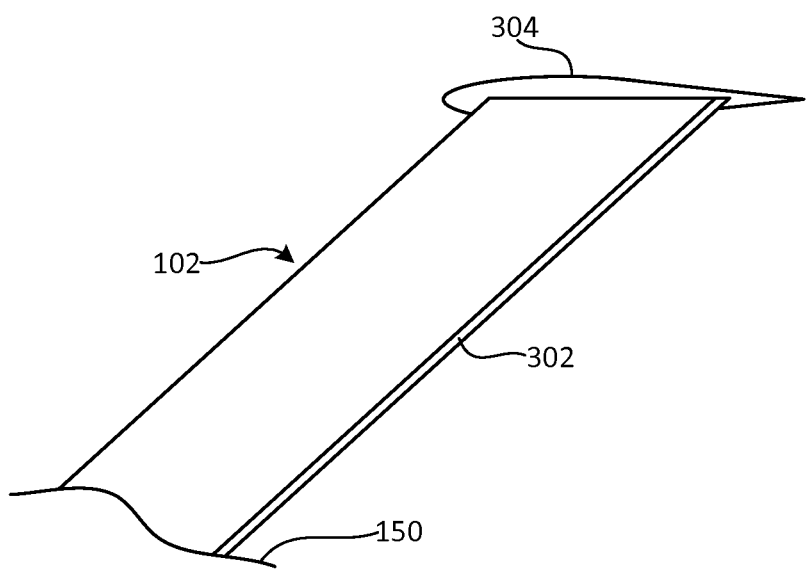
FIG. 3C illustrates a perspective view of a wingsail according to various embodiments.

FIG. 3A illustrates a side view of a deployed wingsail 102 according to various embodiments. FIG. 3B illustrates a top view of the deployed wingsail 102 according to various embodiments. FIG. 3C illustrates a perspective view of the deployed wingsail 102 according to various embodiments.

Referring to FIGS. 1-3C, in some embodiments, the wingsail 102 includes T-strip 302 (or generally perpendicular flange or lip) along an edge of the wingsail 102, an end plate 304 at the top of the wingsail 102 opposite the container 150, and a wind sensor 306. In some embodiments, the wingsail 102 extends from the container 150 such that the wingsail 102 is substantially perpendicular to the container 150, when deployed. In other embodiments, the wingsail 102 may be supported at an oblique angle relative to the container 150. In some embodiments, the wingsail 102 is made from any suitable light-weight, high-strength rigid material, such as, but not limited to, carbon fiber composites. In some embodiments, the wingsail 102 has a steel core with a fiber glass composite layer covering the steel core. In other embodiments, other suitable materials may be used for the core and/or cover layer.

In some embodiments, the wingsail 102 includes a first length-wise edge and a second length-wise edge opposite the first length-wise edge. The T-strip 302 may be located along the second length-wise edge of the wingsail 102 such that airflow contacts the T-strip 302 after contacting the first length-wise edge. In some embodiments, the T-strip 302 is made from any rigid material, such as, but not limited to, fiber glass, steel, sufficiently high strength polymer, or the like. In some embodiments, the T-strip 302 is proportional to the width of the wingsail 102 and is substantially smaller than the width of the wingsail 102 (e.g., about 3 inches wide).

In some embodiments, the end plate 304 may have a teardrop shape including a head, a tail, and an enlarged portion between the head and the tail. Accordingly, the shape of the end plate 304 is configured to channel the wind to flow across the wingsail 102.

In some embodiments, the wind sensor 306 is configured to sense direction and/or strength of the wind. The wind sensor 306 may be coupled to the motor assembly 104 and may dictate the orientation of the wingsail 102 to optimize wind propulsion.

In some embodiments, the wingsail 102 has a lift center at about 50% of a height of the deployed wingsail 102 and at a 25% chord along a width of the deployed wingsail 102. In some embodiments, the wingsail 102 rotationally pivots along an axis along the length of the wingsail 102 extending from the container 150 to the end plate 304, and the axis is located at about a 25% chord of the width.

Figure 4:
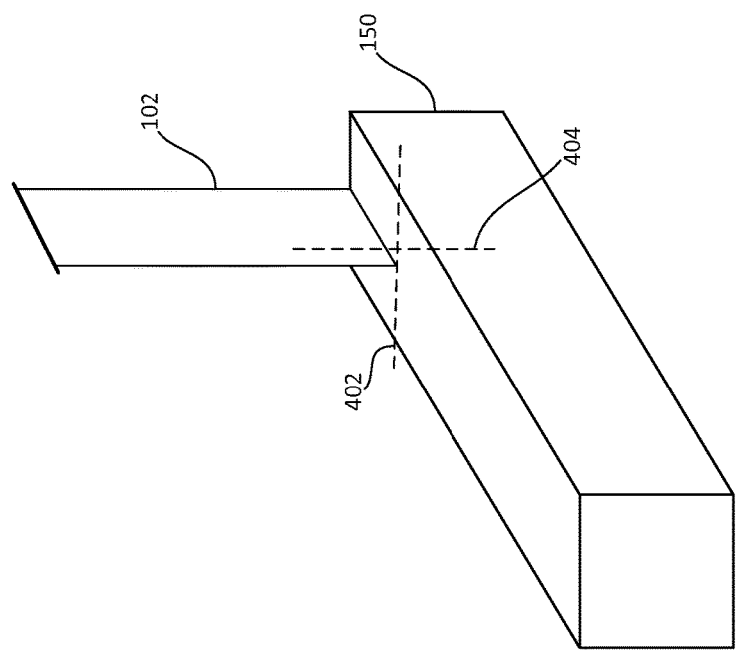
FIG. 4 illustrates a perspective view of a wingsail deployed from a container according to various embodiments.

FIG. 4 illustrates a perspective view of the wingsail 102 deployed from the container 150 according to various embodiments. Referring to FIGS. 1A-4, in some embodiments, the wingsail 102 is deployed by unfolding out of the container 150 at the horizontal pivot axis 402. Furthermore, the wingsail 102 may rotationally pivot, to the optimal orientation for receiving wind for propulsion, about the vertical axis 404. The wingsail may include one or more pivot joints (or multi-axis joints) for rotating, folding or unfolding of the wingsail structure about one or more pivot axes. The one or more pivot joints (or multi-axis joints) may be arranged along the length of the body of the wingsail 102 or along the length of a mast or other support structure for supporting the wingsail in its deployed state (or along the length of both the wingsail body and mast). After deployment and use, the wingsail 102 may again pivot along the horizontal axis 402 for folding and storage within the container 150 until later use. In particular embodiments, the wingsail 102 (or mast or both) includes a plurality of joints along its length for rotation, folding or unfolding at discrete locations along the length of the wingsail 102 (or mast or both), to selectively deploy the wingsail from a stowed state, or retract the wingsail to a stowed state.

In some embodiments, the motor assembly 104 powers the folding into and unfolding out of the container 150. The motor assembly 104 may include any suitable mechanism for deploying and retracting the wingsail 102, such as, but not limited to, a hydraulic system, electric motors, an air-powered system, or the like.

Figure 5A:
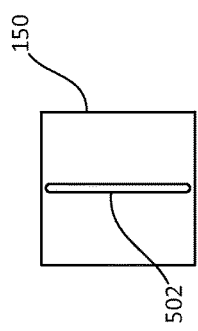
FIG. 5A, FIG. 5B, and FIG. 5C illustrate cross-sectional views of a container housing wingsails oriented differently according to various embodiments.
Figure 5B:
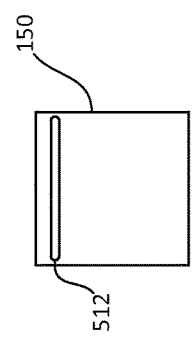
Figure 5C:
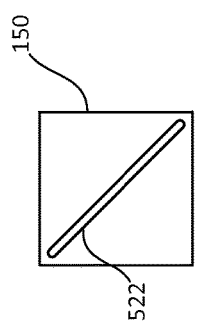

FIGS. 5A, 5B, and 5C illustrate cross-sectional views of the container 150 housing wingsails oriented differently according to various embodiments. Referring to FIGS. 1A-5A, in some embodiments, a wingsail 502 is oriented vertically when housed within the container 150. The wingsail 502 may be housed at the center of the container 150 such that cargo may be stored in the empty space at either side of the container 150.

Referring to FIGS. 1A-5B, in some embodiments, a wingsail 512 is housed horizontally and towards an upper inner surface of the container 150. The wingsail 512 may be deployed from the container 150 by first pivoting about the horizontal axis 402 until extending substantially vertically from the container 150, and then pivot about the vertical axis 404 for proper orientation with respect to wind.

Referring to FIGS. 1A-5C, in some embodiments, a wingsail 522 is housed diagonally within the container 150. More specifically, the width dimension or the length dimension (or both) of the wingsail 522 may be arranged within the container 150 at an angle (diagonal) relative to the width dimension or the length dimension (or both) of the container 150. In such embodiments, the wingsail 522 can be manufactured with a larger surface area (e.g., width or length, or both) relative to a wingsail configuration that is stowed with its width dimension or length dimension (or both) parallel to the width dimension or length dimension (or both) of the container 150. As such, due to its increased surface area, the wingsail 522 may be capable of contacting more wind or air, resulting in greater propulsion of a ship.

FIGS. 6A, 6B, and 6C illustrate perspective views of various wingsail configurations deployed from the container 150 according to various embodiments. Referring to FIGS. 1A-6A, in some embodiments, the container 150 houses two wingsails 602A and 602B. The wingsails 602A and 602B may be configured to deploy at opposite ends of the container 150.

Referring to FIGS. 1A-6B, in some embodiments, the container 150 houses two wingsails 612A and 612B. The wingsails 612A and 612B may be configured to deploy at a same end of the container 150 such that the wingsails 612A and 612B are substantially overlapping with each other. This configuration may be similar to those of biplane aircrafts.

Referring to FIGS. 1A-6C, in some embodiments, the container 150 houses four wingsails 622A, 622B, 622C, and 622D. The wingsails 622A and 622B may form a biplane configuration at a first end of the container, and the wingsails 622C and 622D may form a biplane configuration at a second end of the first container 150 opposite the first end.

In some embodiments, a tie bar is connected between at least two wingsails. The two wingsails may be configured to be deployed from and stowed in the same container. In other examples, the two wingsails may be configured to be deployed from and stowed in two different containers, respectively, where the two containers are arranged adjacent or in sufficient proximity to each other when anchored to a vessel or vehicle. The tie bar is configured to set and synchronize an angle of attack of the at least two wingsails with respect to wind such that the wingsails provide propulsion in substantially the same direction. The tie bar is further configured to set the angel of attack of the at least two wingsails at substantially the same time. For example, wingsails 602A, 602B may have a tie bar connected therebetween so that the angle of attack by the wind is substantially the same between the two separate wingsails 602A, 602B. In some embodiments, the tie bar extends between the two wingsails 602A, 602B along the length of the container 150.

In some embodiments, the tie bar is connected at a same location of each of the wingsails 602A, 602B, for example, at the top of each of the wingsails 602A, 602B, at a same edge of each of the wingsails 602A, 602B, and so on. When connected to the wingsails, the tie bar provides a sufficiently rigid structure to maintain the connected wingsails parallel or at a fixed angle relative to each other, while allowing the connected wingsails to rotate together (about a vertical axis) to a desired orientation relative to the wind direction. Also, by connecting multiple wingsails together with a tie bar, a motor for rotating the wingsails to a desired orientation may be coupled to one of the connected wingsails, to drive both of the connected wingsails. In some embodiments, the tie bar is made from any strong and rigid material suitable for synchronizing the angle of attack of each of the wingsails 602A, 602B, such as, but not limited to, metal, plastic, wood, and so on. In some embodiments, the tie bar is fastened to each wingsail by any suitable securing mechanism, such as, but not limited to, clamping, welding, using adhesive, and so on. In some embodiments, multiple tie bars may be fastened between and to each connected wingsail.

In some embodiments, one or more tie bars may be employed with other wingsail configurations. For example, one or more tie bars may be fastened between the wingsails 612A, 612B. In some embodiments, one or more tie bars are disposed among some or all of the wingsails 622A, 622B, 622C, 622D so that movement and the deployed angle of each wingsail 622A, 622B, 622C, 622D is synchronized with one or more other wingsails. In some embodiments, a first tie bar is attached between wingsails 622A, 622B and a second tie bar is attached between wingsails 622C, 622D. In some embodiments, a first tie bar is attached between wingsails 622A, 622D and a second tie bar is attached between wingsails 622B, 622C. In some embodiments, a first tie bar is attached between wingsails 622A, 622D and a second tie bar is attached between wingsails 622B, 622C. In some embodiments, less than all of the wingsails in a container 150 have a tie bar attached thereto (e.g., wingsails 622A, 622B, 622C have a tie bar attached amongst each other, but 622D does not have a tie bar attached thereto). As an example, and as shown in FIG. 6C, a first tie bar 632 is attached between the wingsail 622C and the wingsail 622D. In addition, a second tie bar 634 is attached between the wingsail 622A and the wingsail 622B.

Figure 7A:
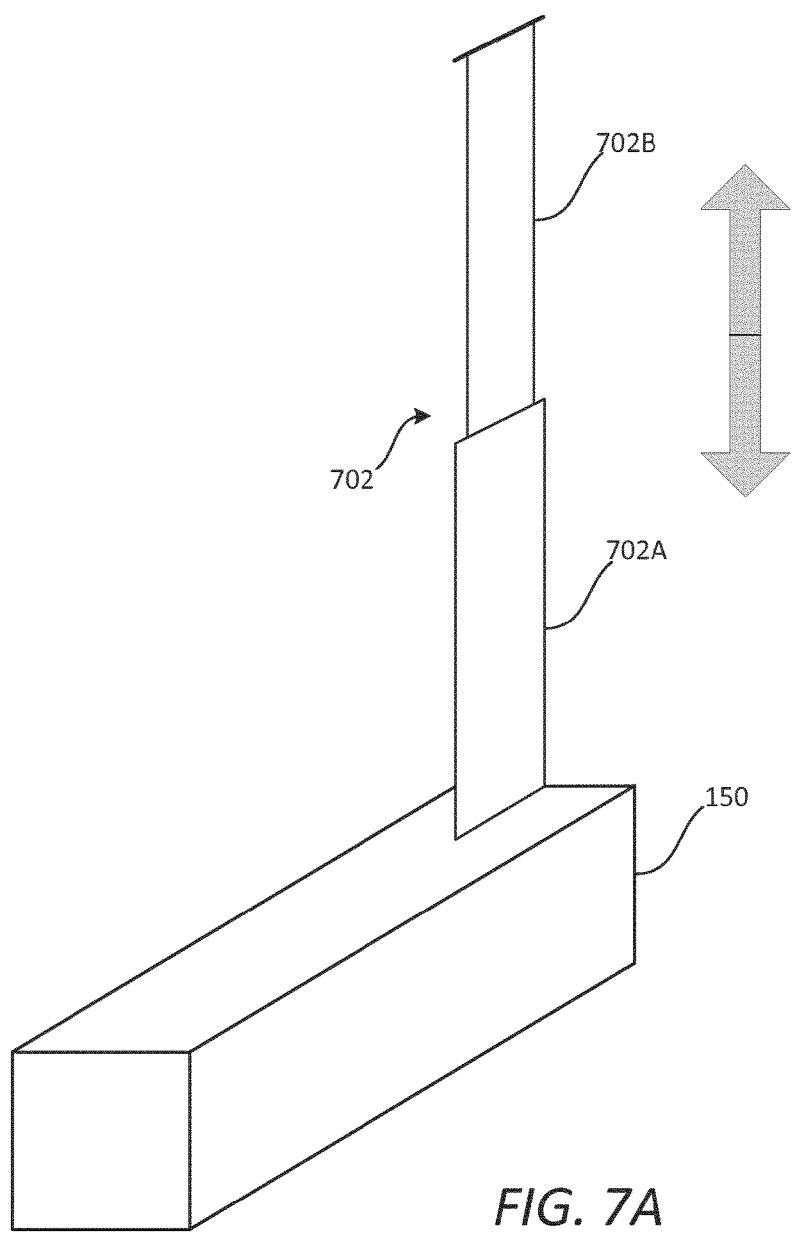
FIG. 7A illustrates a perspective view of a telescoping wingsail deployed from a container according to various embodiments.

FIG. 7A illustrates a perspective view of a telescoping wingsail 702 deployed from the container 150 according to various embodiments. Referring to FIGS. 1-7A, in some embodiments, the wingsail 702 includes a first wingsail portion 702A and a second wingsail portion 702B. In some embodiments, the first wingsail portion 702A is configured to house the second wingsail portion 702B therein, when the wingsail 702 is housed within the container 150. When the wingsail 702 is deployed, the second wingsail portion 702B may extend or telescope from the first wingsail portion 702A, thereby providing more surface area of the wingsail 702 that can receive airflow. At the same time, the wingsail 702 may maintain a compact structure that can fit within the container 150, as the second wingsail portion 702B may retract into the first wingsail portion 702A.

Figure 7B:
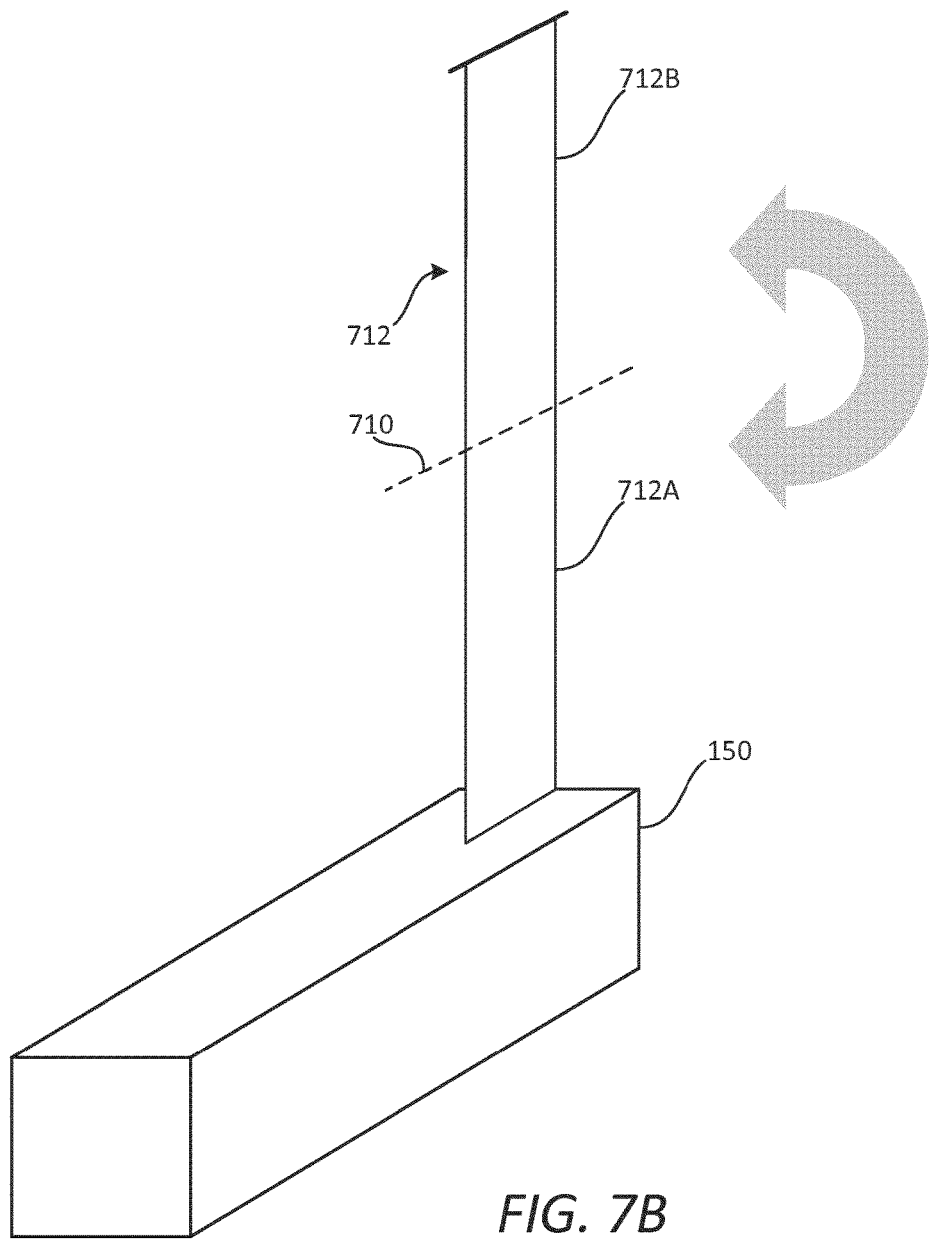
FIG. 7B illustrates a perspective view of a folding wingsail deployed from a container according to various embodiments.

FIG. 7B illustrates a perspective view of a folding wingsail 712 deployed from the container 150 according to various embodiments. Referring to FIGS. 1-7B, in some embodiments, the wingsail 712 includes a first wingsail portion 712A and a second wingsail portion 712B. In some embodiments, the second wingsail portion 712B is configured to unfold at an axis 710 when the wingsail 712 is deployed. In some embodiments, when the wingsail 712 is housed within the container 150, the first wingsail portion 712A and the second wingsail portion 712B are folded on each other so that the wingsail 712 fits within the container 150.

Figure 7C:
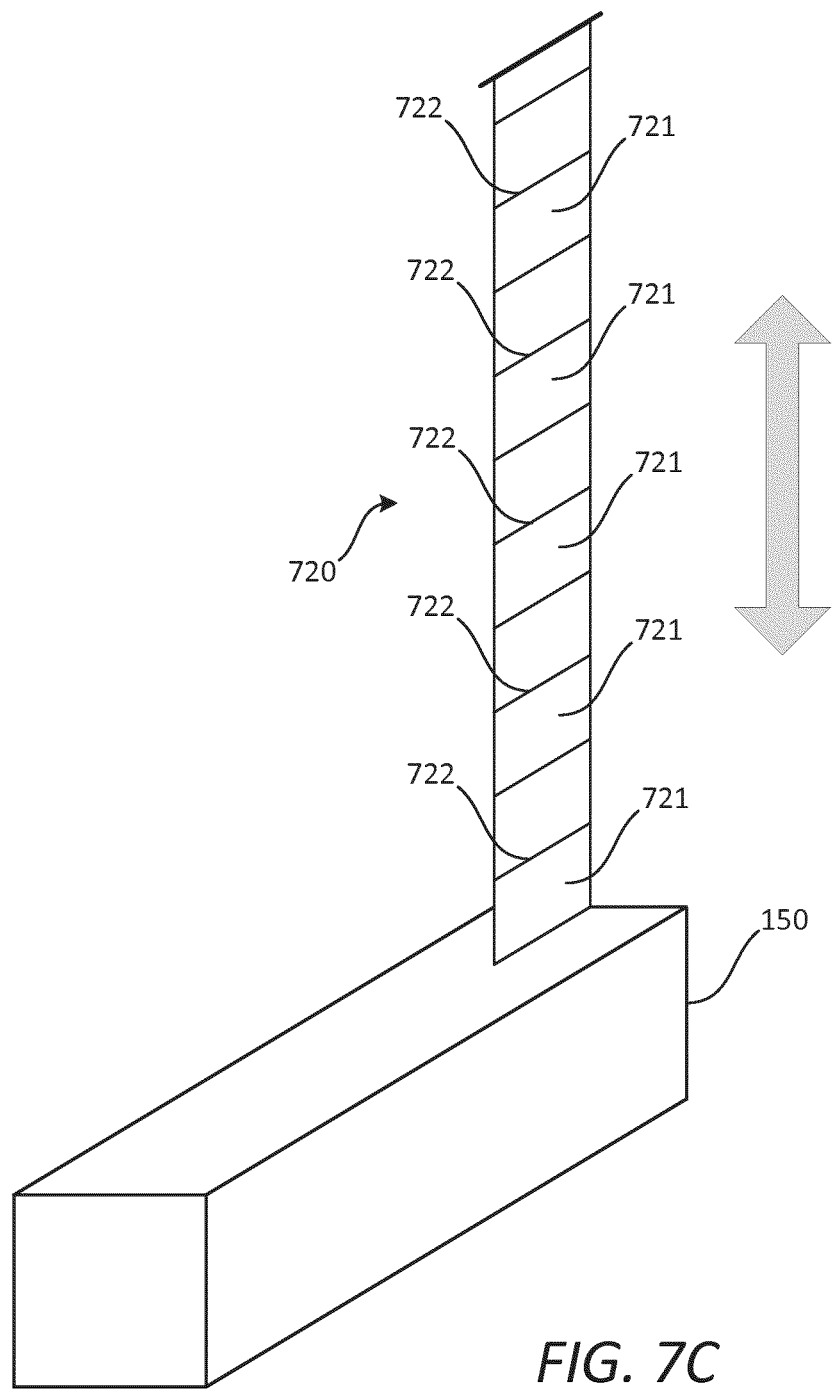
FIG. 7C illustrates a perspective view of a multiple-folding wingsail deployed from a container according to various embodiments.

FIG. 7C illustrates a perspective view of a multiple-folding wingsail 720 deployed from the container 150 according to various embodiments. Referring to FIGS. 1-7C, in some embodiments, the wingsail 720 includes a plurality of wingsail sections 721 that are separated by a plurality of wingsail folds 722. In some embodiments, when deployed, the wingsail sections 721 are separated and in an extended state. However, when housed within the container, the plurality of wingsail sections 721 may be collapsed upon each other at the folds 722, such that the wingsail 720 is in a compact state for storing within the container 150.

In some embodiments, a wingsail includes a combination of the features depicted in FIGS. 7A-7C. For example, in some embodiments, a wingsail unfolds once deployed out of the container 150 (e.g., as shown in FIG. 7B), and then the wingsail is configured to telescope upwards (e.g., as shown in FIG. 7A). Accordingly, in some embodiments, the container 150 can stow additional wingsail material to allow further propulsion when the wingsail is deployed (e.g., additional surface area of the wingsail is deployable from the container 150).

In other embodiments, the multiple-folding wingsail 720 may have a plurality of length-wise wingsail folds, as opposed to the width-wise wingsail folds 722, such that the wingsail 720 includes a plurality of length-wise wingsail sections 721. Accordingly, in some embodiments, a wingsail having the plurality of length-wise wingsail folds may deploy from and retract into the container 150 in a similar manner as that of a conventional hand fan.

Figure 8A:
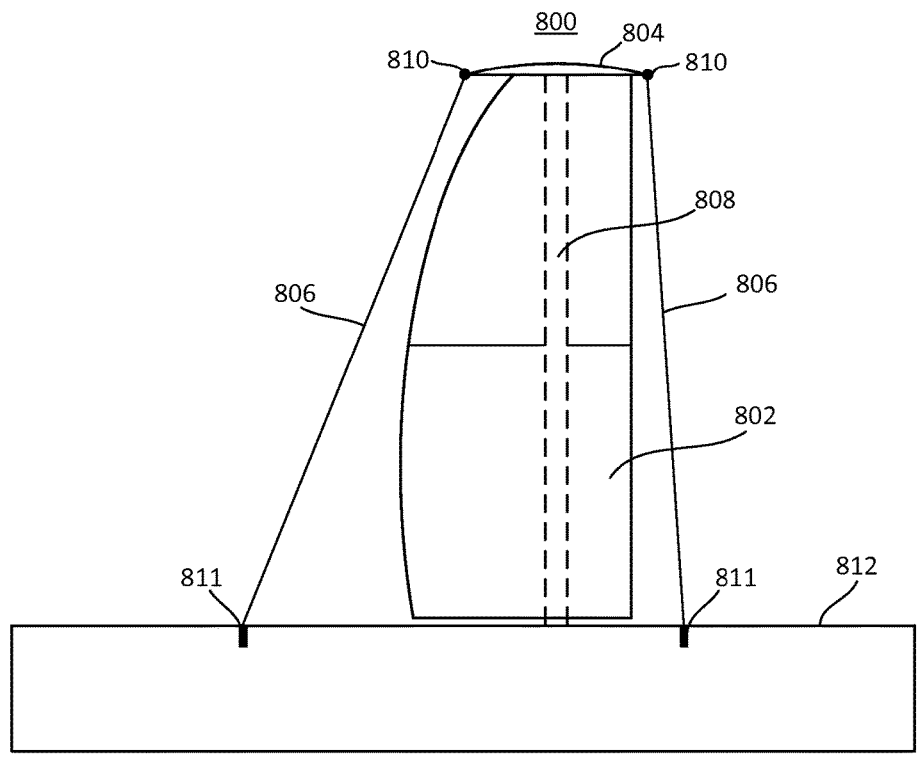
FIG. 8A illustrates a side view of a wingsail system according to various embodiments.
Figure 8B:
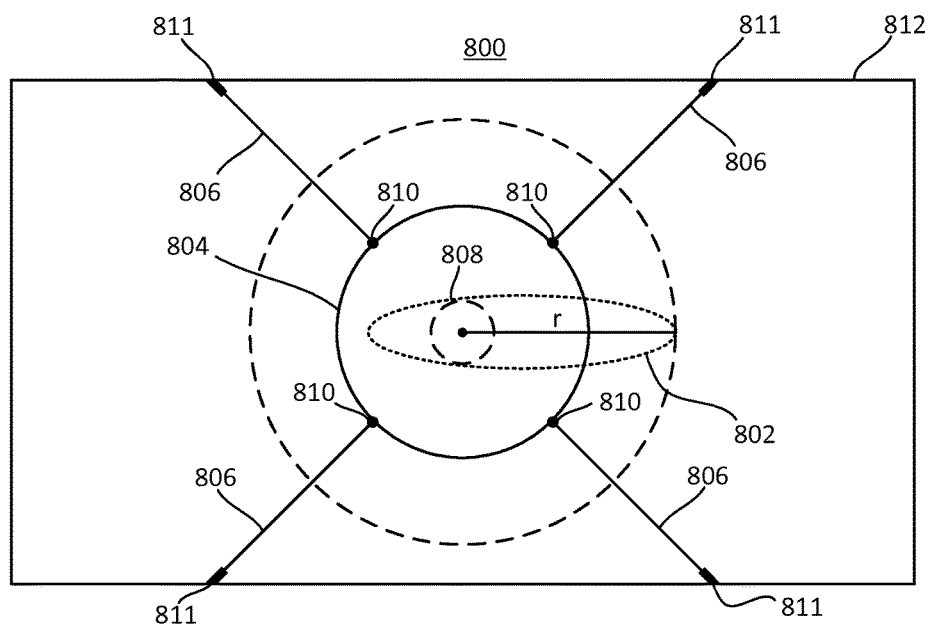
FIG. 8B illustrates a top view of a wingsail system according to various embodiments.

FIG. 8A illustrates a side view of a wingsail system 800 according to various embodiments. FIG. 8B illustrates a top view of the wingsail system 800 according to various embodiments. A conventional vessel or vehicle may not be fitted or manufactured to support shipping container or a wingsail. According to various embodiments, the wingsail system 800 may be added to or installed on a vessel or vehicle that was not initially designed to carry cargo containers or a wingsail. As such, the wingsail system 800 may provide a mechanism for allowing retrofitting of a wingsail onto any suitable vessel or vehicle. Accordingly, in some embodiments, a cost of installation or retrofitting of wingsails on vessels or vehicles is reduced. Furthermore, the vessels or vehicles that would otherwise not be configured to support a wingsail can be re-configured or retrofitted with a wingsail and therefore exhibit reduced fuel costs, greenhouse gases, and emissions.

In some embodiments, the wingsail system 800 includes a wingsail 802, an end plate 804, one or more support cables 806, a wing axle 808, and one or more anchor locations 811 corresponding to anchoring positions of the one or more support cables 806. In some embodiments, the wingsail system 800 is installed atop a vessel 812, such as, but not limited to, on top of a deck of a ship or other water vessel, or on top of a deck of a rail car or other vehicle. In some embodiments, the wing axle 808 is a shaft or tubular structure that is positioned on top of the vessel 812 such that the wing axle 808 (axle of the shaft or tubular structure) extends substantially vertically upwards from the vessel 812. The wing axle 808 may be a hollow structure, for minimizing weight. In other embodiments, the wing axle 808 is a solid structure. In some embodiments, the wing axle 808 is placed on top of the vessel 812 and is secured via the one or more support cables 806. In other embodiments, the lower end of the wing axle 808 is also coupled or otherwise secured in a fixed relation to the vessel 812 by one or more brackets, welding, clamping, form-fitting, and the like. In some embodiments, the wing axle 808 is made from any suitable material for supporting the wingsail system 800, such as, but not limited to, steel, carbon fiber, or other suitable materials.

In some embodiments, the wingsail 802 is similar to wingsails 102, 502, 602, 612, 622, 702, 712, 722, such that the respective descriptions of wingsails 102, 502, 602, 612, 622, 702, 712, 722 are applicable to the wingsail 802. In other embodiments, the wingsail 802 may have other suitable dimensions or shapes. In some embodiments, the wingsail 802 surrounds or is attached to the wing axle 808 such that the wingsail 802 is capable of rotation about the longitudinal axis of the wing axle 808. In some embodiments, the wingsail 802 includes bearings therein to allow 360-degree or near 360-degree rotation about the wing axle

808. In some embodiments, the wingsail 802 is designed to rotate about the wing axle 808 in a circle having a radius r shown in FIG. 8B (e.g., a radius r defined by a width dimension of the wingsail 802). In some embodiments, the radius r is large enough for the wingsail 802 to be rotated to a suitable position to transform natural wind into propulsion energy, regardless of the direction that the wind is directed. In some embodiments, the wingsail system 800 includes a control system for rotating the wingsail 802 about the wing axle 808. For example, the wingsail system 800 may include a motor assembly (e.g., similar to motor assembly 104) for rotating the wingsail 802 to its optimal position for providing propulsion to the vessel 812.

In some embodiments, an end plate 804 is positioned or located on top of the wing axle 808. In some embodiments, the end plate 804 is fastened to the wing axle 808 to secure the end plate 804 to the wing axle 808 by, for example, but not limited to, welding, clamping, bolting, using adhesive, and the like. In some embodiments, the end plate 804 does not rotate (e.g., like the wingsail 802 does), and is therefore stationary. As such, in some embodiments, one or more accessories are affixed to the top or other portion of the end plate 804, such as, but not limited to, a radar, lights, a wind vane, an acoustic mechanism (e.g., a speaker), or other electronics. In some embodiments, the end plate 804 improves efficiency of the wingsail 802 by reducing vortexes (the "end plate effect") that are typically generated in a system that lacks the end plate 804. In embodiments in which the wing axle 808 includes a hollow tubular structure, through which electrical wiring may be run for connecting radar, lights, speakers or other electronic devices affixed to the end plate 804 to computers, control systems or other electronics located on the vessel.

In some embodiments, the dimensions of the end plate 804 are selected or sized such that vortex losses are minimized at the wingsail 802. Furthermore, the end plate 804 is sized large enough (e.g., has a large enough diameter) such that the support cables 806 do not interfere with the wingsail 802, as the wingsail 802 rotates. For example, at any position along the length of each support cable 806, a minimum radius (from the central axis of the wing axle 808) defined by the support cables 806 is greater than a radius of the wingsail 802 around the wing axle 808 (e.g., a radius of the wingsail 802 at that position, or the radius r). In some embodiments, the plate is shaped to be aerodynamic, for example, as a domed or curved or angled shape (e.g., to allow wind to traverse the end plate 804 with minimal interference from the end plate 804).

In some embodiments, the support cables 806 are coupled or otherwise fastened to fastening locations 810 along the perimeter of the end plate 804. In some embodiments, the number of fastening locations 810 is equal to the number of affixed support cables 806. In other embodiments, the number of fastening locations 810 is greater than the number of affixed support cables 806, to allow selective positioning or re-positioning of the support cables 806 relative to the end plate 804. In some embodiments, the fastening locations 810 are located at regular intervals along the perimeter of the end plate 804. In other embodiments, the fastening locations 810 are located at irregular intervals along the perimeter of the end plate 804. In some embodiments, each of the support cables 806 is affixed to a corresponding fastening location 810 by way of, for example, tying, welding, clipping, and the like.

In some embodiments, the anchor locations 811 are located on the vessel 812. In some embodiments, the anchor locations 811 are located on the outside of the vessel 812 along a sheer line. In some embodiments, the anchor locations 811 are located at a location where the deck and the hull of the vessel 812 meet. In some embodiments, each of the support cables 806 is anchored or otherwise fastened at respective anchor locations 811 at an end of the support cable 806 (e.g., a first end) opposite the end of the support cable 806 (e.g., a second end) affixed to a respective fastening location 810. Accordingly, in the some embodiments, the support cables 806 are taut between the end plate 804 and the anchor locations 811 to support and stabilize the wingsail system 800, with the central axis of the wing axle 808 oriented substantially, vertical. In some embodiments, the support cables 806 are fastened to the anchor locations 811 by any suitable method, such as, but not limited to, bolding, welding, clamping, tying, and the like. In some embodiments, the number of support cables 806 affixed between the end plate 804 and the vessel 812 is four or more (e.g., five, six, seven, or more). In other embodiments, the number of support cables 806 affixed between the end plate 804 and the vessel 812 is less than four (e.g., three). In some embodiments, the support cables 806 are manually or automatically tightened (e.g., individually and/or by rotational force at the anchor locations 811) to provide tension along the support cables 806 for securing the wingsail 802 to the vessel 812. In some embodiments, the support cables 806 are made from any suitable material for supporting the wingsail system 800, such as, but not limited to, spectra fiber, synthetic rope, steel (e.g., galvanized steel), and the like.

In some embodiments, by utilizing the support cables 806 between the end plate 804 and the vessel 812, engineering loads on the vessel 812 (e.g., loads on a hull of a ship) are reduced. For example, in some embodiments, ten times less force on the vessel 812 (e.g., force on the hull of a ship) is exerted by the wingsail system 800 (e.g., in using the support cables 806). Furthermore, in some embodiments, by providing supplemental support via the support cables 806, a less expensive or lower strength material may be employed in the wing axle 808. In addition, in some embodiments, the end plate 804 provides the multiple functions of providing an anchor for the support cables, reducing vortex losses, and providing a mounting location for lights, radar or other devices.

In some embodiments, the wingsail system 800 is permanently affixed to the vessel 812 such that the wingsail system 800 is permanently erect. In other embodiments, the wingsail system 800 is deployable atop the vessel. For example, the wing axle 808 may be configured to telescope upwards into an erect position and pull or stretch the support cables 806 taught, to allow a stable position of the wingsail system 800 when fully deployed. In some embodiments, the support cables 806 may be configured to be pulled taught manually, or by motor-driven mechanical cable pulling devices, after telescoping or unfolding deploying of the wingsail, to stabilize the deployed wingsail in its deployed position. In some embodiments, the wingsail system 800 is removable and replaceable from atop the vessel 812, for example, by being stowed in and deployable from a container (e.g., container 150). In embodiments in which the wingsail system 800 is installed on a rail car system (e.g., on train 250), the description above may be similarly applicable (e.g., where the wingsail system 800 can be installed atop one or more railcars 254*a*, 254*b*, and 254*c*).

FIG. 9A and FIG. 9B illustrate a side view of the container 150 including a wingsail 102 and an air deflection panel 902 according to various embodiments. In some embodiments, the air deflection panel 902 is affixed to a side of the container 150. The air deflection panel 902 may substantially cover a surface of the container 150 (e.g., most or all of a side surface of the container 902). In other embodiments, the air deflection panel 902 covers a portion of a side surface of the container 150 (e.g., three-fourths, half, or less than half of the side surface of the container 150). In some embodiments, the air deflection panel 902 is made from any suitable material, such as, but not limited to, steel, wood, and the like. In some embodiments, one or more (or a plurality of) air deflection panels 902 are attached to each of one or more (or a plurality of different) side surfaces of the container 150, e.g., at opposite sides of the container 150.

The air deflection panel 902 is moveable between a folded state (FIG. 9A) and an extended state (FIG. 9B). In some embodiments, the air deflection panel 902 is pivotally attached to the container 150 (e.g., by a pivotal linkage or hinge) along one edge (for example, the top edge) of the air deflection panel 902, such that the air deflection panel 902 (from its bottom edge) pivots outwards about the axle of the hinge. When pivoted outward, the air deflection panel 902 defines an angled surface (angled relative to the side surface of the container 150 that is covered by the air deflection panel), such that wind blowing towards the side surface of the container 150 can be directed by the angled surface of the air deflection panel 902 towards the wingsail 102 (e.g., as shown in FIG. 9B). In some embodiments, vortex disturbances that would otherwise be produced at sharp corners of the container 150 can be reduced by use of the extended air deflection panel 902. Thus, the extended air deflection panel 902 can allow the container 150 to be more aerodynamic and can help to direct more air flow toward a deployed wingsail 102. In some embodiments, the air deflection panel 902 may be moved to an extended (angled) state when (or only when) the wingsail 102 is deployed. In other embodiments, the air deflection panel 902 also may be extended when the wingsail 102 is stowed within the container 150, to improve the aerodynamics of the container 150. In yet other embodiments, a container 150 may be configured with and include one or more air deflection panels 902, but not contain a wingsail 102, for example, to provide a container 150 with improve the aerodynamics.

In some embodiments, a motor assembly is coupled to the air deflection panel 902 to move the panel between the folded state and the extended state. The motor assembly may be coupled to a gear, hydraulic pump or other suitable mechanism for moving the air deflection panel 902 between the folded state and the extended state. For example, a telescoping hydraulic cylinder may be coupled at one end to the air deflection panel 902 and at another end to the container 150, such that when pressurized, the hydraulic cylinder expends in length and pivots the air deflection panel 902 outward to an extended state as shown in FIG. 9B, and when unpressurized, the hydraulic cylinder retracts in length to allow the air deflection panel 902 to pivot downward (e.g., by gravity or manual pressure) to a folded state, as shown in FIG. 9A. In such embodiments, the telescoping hydraulic cylinder may be coupled to a pressurized fluid source or motor for providing pressurized fluid (gas or liquid) to the hydraulic cylinder, for selectively expanding or retracting the length of the telescoping hydraulic cylinder. In other embodiments, a motor connected to a suitable gear, lever or other mechanical linkage structure may be coupled to the air deflection panel 902 in any suitable manner, for selectively moving the air deflection panel between the folded state and the extended state. In yet other embodiments, manual force may be used to lift or push the air deflection panel 902 between the folded state and the extended state, as desired.

In particular embodiments, the hydraulic cylinder or other linkage structure may be configured to maintain the air deflection panel 902 in an extended state, once moved to that state and until the air deflection panel 902 is selectively moved to the folded state. In other embodiments, a further mechanical or electromechanical lock mechanism is provided to lock and retain the air deflection panel 902 in an extended state, once moved to that state and until unlocked from that state.

FIG. 10A illustrates a side view of a wingsail 1002 according to various embodiments. FIG. 10B illustrates a side view of a wingsail 1012 according to various embodiments. In some embodiments, a wingsail includes an airflow control mechanism for controlling or directing wind as it flows over the body of the wingsail to control the related thrust provided by the wingsail.

Referring to FIG. 10A, in some embodiments, the wingsail 1002 includes a vertical axis control flap 1004 along a trailing edge of the wingsail 1002 (e.g., an edge where the wind contacts the wingsail 1002 second or after initially contacting the wingsail 1002 at an opposite edge to the trailing edge). The vertical axis control flap 1004 is configured to control the angle of attack of the wingsail 1002 with respect to the wind. Accordingly, in some embodiments, the airflow over the flap causes the wingsail 1002 to engage into the wind and therefore provide thrust. In some embodiments, the vertical axis control flap 1004 is configured to pivot about the trailing edge of the wingsail 1002. In other embodiments, the vertical axis control flap 1004 is fixed at a predetermined orientation with respect to the trailing edge of the wingsail 1002 (e.g., at a 45-degree orientation with respect to a plane on which the main body of the wingsail 1002 lies). The vertical axis control flap 1004 may be oriented at various angles with respect to the main body of the wingsail 1002 to suitably cause the main body of the wingsail 1002 to rotate in relation to the predominant direction wind if coming from, such as, but not limited to 30-degrees, 70-degrees, or any other suitable angle. In some embodiments, the vertical axis control flap 1004 is perpendicular to the main body of the wingsail 1002. In some embodiments, the vertical axis control flap 1004 is coupled to a motor for changing the orientation of the vertical axis control flap 1004. In some embodiments, the vertical axis control flap 1004 is made from a same material as that of the main body of the wingsail 1002. In other embodiments, the vertical axis control flap 1004 is made from a more rigid material, such as, but not limited to, metal, plastic, and so on.

Referring to FIG. 10B, in some embodiments, the wingsail 1012 includes a protruding portion 1014 at a top of the wingsail 1012. The protruding portion 1014 includes a rear vertical axis flap or trim tab at the upper trailing edge of the wingsail 1012. In some embodiments, the protruding portion 1014 is configured to utilize airflow over this portion to cause the larger wingsail 1012 to engage into the wind and therefore provide thrust similar to physics of a common airplane wing. In some embodiments, the protruding portion 1014 extends upwards beyond the main body of the wingsail 1012, at an angle with respect to a bottom surface 1012A of the wingsail 1012. In some embodiments, the protruding portion 1014 is configured to pivot about the upper edge of the wingsail 1012. In other embodiments, the protruding portion 1014 is fixed at a predetermined orientation with respect to the bottom surface 1012A of the wingsail 1012 (e.g., at a 45-degree orientation). The protruding portion 1014 may be oriented at various angles with respect to the bottom surface 1012A of the wingsail 1012 to suitably rotate in relation to the wind at a given angle, such as, but not limited to 30-degrees, 70-degrees, or any other suitable angle, causing the main body of the sail to be positioned at an angle in relation to the wind that causes thrust. In some embodiments, the protruding portion 1014 is coupled to a motor for changing the orientation of the protruding portion 1014. In some embodiments, the protruding portion 1014 is made from a same material as that of the main body of the wingsail 1002. In other embodiments, the protruding portion 1014 is made from a more rigid material, such as, but not limited to, metal, plastic, and so on.

The above used terms, including "attached," "connected," "secured," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. A shipping container comprising:
   a container configured to be secured onto a vessel or a vehicle; and
   at least one wingsail stored in the container and configured to be unfolded to deploy from the container and folded to be stowed in the container;
   wherein the wingsail comprises an aerodynamic wing structure that is made of a rigid material that extends from the container and that is configured and supported to create lift force in a propelling direction of the vessel or vehicle, when the wingsail is unfolded and deployed;
   wherein the container is a standard-sized shipping container.

2. The shipping container of claim 1, wherein the at least one wingsail comprises a plurality of wingsails.

3. The shipping container of claim 2, wherein each of the plurality of wingsails is located at an opposite end of the container when unfolded.

4. The shipping container of claim 2, wherein each of the plurality of wingsails is located at a same end of the container when unfolded.

5. The shipping container of claim 1, wherein a width of the wingsail rests diagonally along one or both of a height or width dimension of the container when the wingsail is folded in the container.

6. The shipping container of claim 1, wherein the vessel is one of a ship, a barge, a catamaran, or a yacht.

7. The shipping container of claim 1, wherein the vehicle is a railcar.

8. The shipping container of claim 1, further comprising an air deflection panel affixed to a side surface of the container and configured to be selectively moved between an extended state and a folded state, wherein at least a portion of the air deflection panel is extended outwards at an angle from the side surface when in the extended state, and is folded towards the side surface when in the folded state.

9. The shipping container of claim 1, wherein the container is selectively stackable on at least one other container and selectively removable from the vehicle or the vessel.

10. The shipping container of claim 1, wherein the container has an interior volume that is configured to house the wingsail with the wingsail folded along its longitudinal axis and arranged along a length dimension of the container when the wingsail is folded and stowed in the container, and wherein the wingsail is configured to extend vertically along its longitudinal axis and be supported by the container when the wingsail is unfolded and deployed.

11. The shipping container of claim 1, wherein the wingsail comprises an extending portion and is configured to extend in height after deployment by the extending portion telescoping upwards or by the extending portion unfolding upwards.

12. A method of installing a shipping container, comprising:
   providing a container configured to be secured onto a vessel or a vehicle; and
   storing at least one wingsail in the container, the wingsail configured to be unfolded to deploy from the container and folded to be stowed in the container;
   wherein the wingsail comprises an aerodynamic wing structure that is made of a rigid material that extends from the container and that is configured and supported to create lift force in a propelling direction of the vessel or vehicle, when the wingsail is unfolded and deployed;
   wherein the container is a standard-sized shipping container that is selectively stackable on at least one other shipping container.

13. The method of claim 12, wherein storing the at least one wingsail comprises storing a plurality of wingsails in the container.

14. The method of claim 13, wherein each of the plurality of wingsails is located at an opposite end of the container when unfolded.

15. The method of claim 13, wherein each of the plurality of wingsails is located at a same end of the container when unfolded.

16. The method of claim 12, wherein a width dimension or a length dimension of the wingsail extends diagonally along the a width dimension or a length dimension of the container when the wingsail is stored in the container.

17. The method of claim 12, further comprising securing the container to a vessel, wherein the vessel is one of a ship, a barge, a catamaran, or a yacht.

18. The method of claim 12, further comprising securing the container to a vehicle, wherein the vehicle is a railcar.

19. The method of claim 12, further comprising affixing an air deflection panel to a side surface of the container, the air deflection panel configured to extend outwards from and retract inwards into the container to change the aerodynamics of the container.

20. The method of claim 12, further comprising securing the container to a vehicle or a vessel with an anchoring mechanism that allows the container to be selectively stacked on at least one other container and selectively removed from the vehicle or the vessel.

21. The method of claim 12, further comprising folding the wingsail along its longitudinal axis and arranging the folded wingsail along a length dimension of the container when the wingsail is stowed in the container, and extending the wingsail vertically along its longitudinal axis while being supported by the container when the wingsail is unfolded and deployed.

22. The method of claim 12, wherein the wingsail comprises an extending portion and is configured to extend in height after deployment by the extending portion telescoping upwards or by the extending portion unfolding upwards.

23. A ship comprising:
a deck;
a shipping container comprising:
a container configured to be secured onto the deck; and
at least one wingsail stored in the container and configured to be unfolded to deploy from the container and folded to be stowed in the container;
wherein the wingsail comprises an aerodynamic wing structure that is made of a rigid material that extends from the container and that is configured and supported to create lift force in a propelling direction of the vessel or vehicle, when the wingsail is unfolded and deployed;
wherein the container is a standard-sized shipping container.

24. The shipping container of claim 1, wherein the wingsail has an axis that extends substantially vertically from the container, along an axial length dimension of the wingsail, upon the wingsail being unfolded and deployed.

25. The shipping container of claim 24, wherein the wingsail is supported for rotation about the axis, upon the wingsail being unfolded and deployed.

26. A shipping container comprising:
a container configured to be secured onto a vessel or a vehicle;
at least one wingsail stored in the container and configured to be unfolded to deploy from the container and folded to be stowed in the container; and
a motor supported by the container and connected to the wingsail; the motor configured to power movement of the wingsail from a folded position within the container to a deployed position at least partially outside of the container;
wherein the wingsail comprises an aerodynamic wing structure that is made of a rigid material that extends from the container and that is configured and supported to create lift force in a propelling direction of the vessel or vehicle, when the wingsail is unfolded and deployed.

* * * * *